(12) United States Patent
Miller

(10) Patent No.: US 6,795,174 B1
(45) Date of Patent: Sep. 21, 2004

(54) TRACKING SYSTEMS

(75) Inventor: Lee D. Miller, Filton (GB)

(73) Assignee: MBDA UK Limited, Hertfordshire (GB)

( * ) Notice: Subject to any disclaimer, the term of this patent is extended or adjusted under 35 U.S.C. 154(b) by 1826 days.

(21) Appl. No.: 08/135,764

(22) Filed: Oct. 13, 1993

(30) Foreign Application Priority Data

Oct. 24, 1992 (GB) .............................................. 9222391

(51) Int. Cl.$^7$ .......................... G01B 11/26; G01C 21/02; H04B 10/00
(52) U.S. Cl. .................. 356/141.1; 244/3.11; 244/3.13; 250/203.6; 356/139.08; 398/128
(58) Field of Search .......................... 356/138.08, 141.1; 359/152, 164; 244/3.13, 3.11; 250/203.6; 398/128

(56) References Cited

U.S. PATENT DOCUMENTS

| 3,902,684 | A | * | 9/1975 | Queeney .................... 244/3.14 |
| 4,047,816 | A | | 9/1977 | Pell et al. |
| 4,058,774 | A | * | 11/1977 | Hughes |
| 4,209,253 | A | * | 6/1980 | Hughes |
| 4,315,609 | A | * | 2/1982 | McLean et al. ............ 244/3.14 |
| 4,401,886 | A | * | 8/1983 | Pond et al. |
| 4,674,874 | A | * | 6/1987 | Halldorsson et al. |
| 4,764,982 | A | * | 8/1988 | Pfund |
| 4,951,901 | A | * | 8/1990 | Dunne |

FOREIGN PATENT DOCUMENTS

| EP | 500268 | 8/1992 |
| GB | 1529388 | 10/1978 |
| GB | 2113939 | 8/1983 |

* cited by examiner

Primary Examiner—Stephen C. Buczinski
(74) Attorney, Agent, or Firm—Nixon & Vanderhye P.C.

(57) ABSTRACT

A system for tracking a projectile utilizing a laser beam modulated by an acousto-optic cell. Transponders distributed on hemispheres around the rear of the projectile detect the scanned beam and actively transmit a narrow optical beam back to a ground-based receiver in response to a detection of the scanned beam. IFF information can be modulated onto beam actively transmitted from the transponder. The system provides active two-way communications with comparatively simple components.

13 Claims, 1 Drawing Sheet

TRACKING SYSTEMS

FIELD OF THE INVENTION

This invention relates to systems for tracking projectiles using optical means.

DESCRIPTION OF RELATED ART

On release of a ground or air launched guided missile which is intended to intercept an aerial target, for example, it is necessary to track the missiles position relative to the target up to the point of impact.

It is known to use a scanned laser beam to illuminate a friendly missile and thereby track the missile. For example, in GB-A-2,113,939 receivers on board a missile deduce the missile's position relative to a ground-based tracking system by decoding a modulation superimposed on the scanning beam. This method requires sophisticated electronic circuitry to be carried onboard the missile for the purpose of decoding the modulation. A further disadvantage is the lack of a communications link from the missile back to the tracking system.

SUMMARY OF THE INVENTION

This invention aims to provide a two-way communications link between a tracking station and a friendly missile, the link being realizable using comparatively simple components.

According to the present invention a tracking system comprises:

a transmitter and a receiver, the transmitter including means for producing a scanned optical beam for the illumination of a projectile;

and a plurality of transponders for mounting on the projectile, each transponder comprising a detector/emitter pair for detecting the scanned beam and for emitting a further optical beam in response thereto for reception by the receiver.

The means for producing a scanned optical beam may comprise a laser coupled to a mechanical scanning arrangement (eg. as described in our co-pending Application EP92301208 published as European Patent Application publication number 50026B) or to an acousto-optic deflector cell.

An acousto-optic deflector cell may comprise any suitable material which exhibits an acousto-optic effect ie. diffraction of light by acoustic waves. One example of such a material is tellurium dioxide. Acoustic waves are usually coupled into the cell via a piezoelectric transducer, for example, which is bonded to one face of the cell.

As is known, an acousto-optic deflector cell may be configured to receive a beam of laser light, of frequency f say, and in response to a high frequency drive signal applied to the cell (in the MHz to GHz range), some of the light emerging from the cell is deflected to form a so-called "first order beam". The angle of deflection of this beam with respect to the undeflected zero order beam is substantially proportional to the frequency of the drive signal, (fac) which initiates a sound wave which propagates across the cell. Hence by varying the drive signal frequency in some controllable manner, a beam may be scanned in a single plane. Two dimensional scanning may be achieved by incorporating a second deflector cell through which the first order beam produced by a first cell is arranged to pass as described in GB-A-2,113,939.

The transponders may comprise a single solid-state photodetector element located adjacent to a laser diode. Preferably the divergence of the beam emitted by the laser diode is small in order to minimize the risk of battlefield eye damage.

Some embodiments of the invention will now be described, by way of example only, with reference to the drawing which is a schematic representation of a tracking system in accordance with the invention.

DESCRIPTION OF PREFERRED EMBODIMENTS

Figure 1:
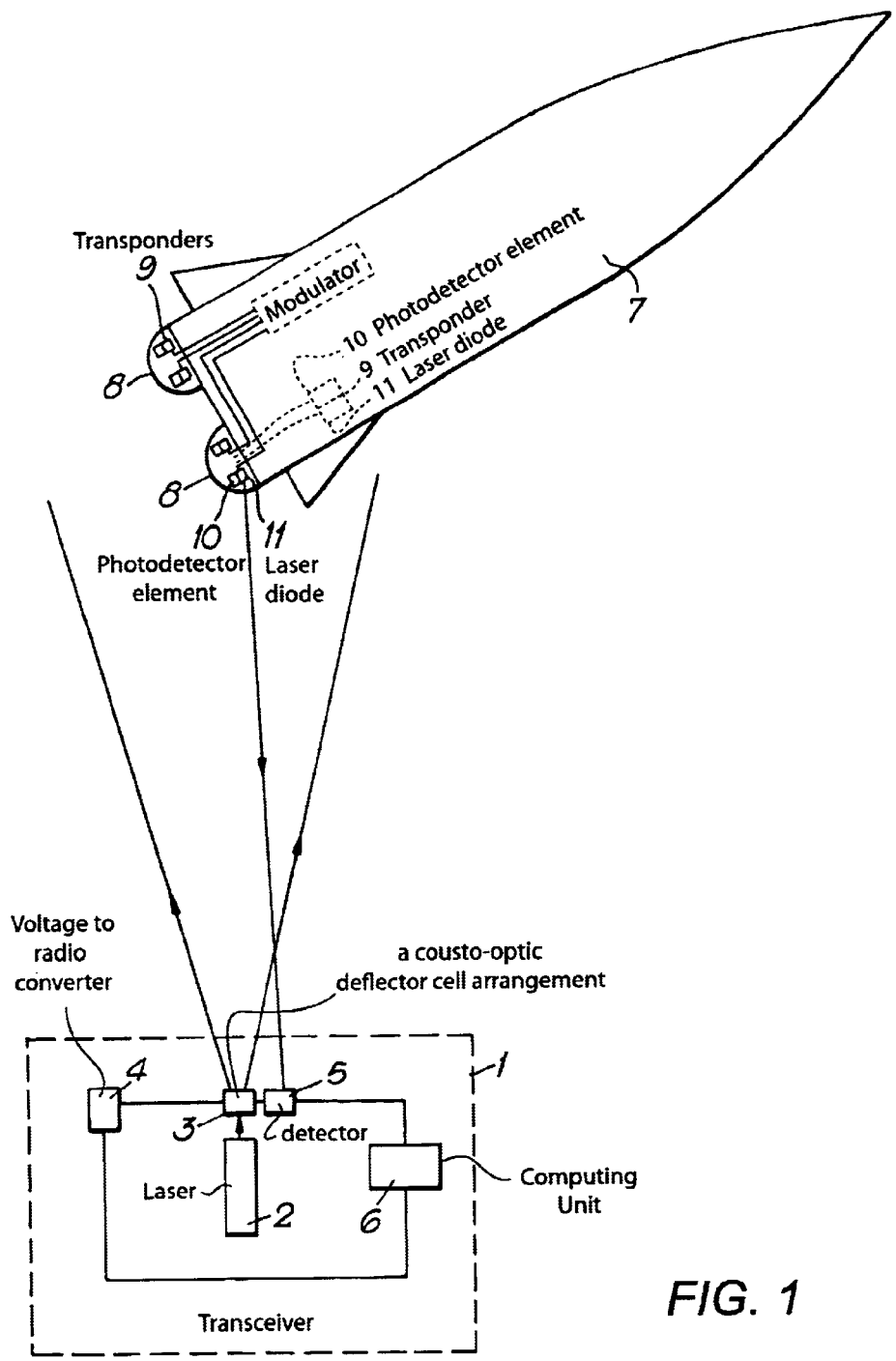
FIG. 1 shows a schematic representation of a tracking system in accordance with the present invention.

In the drawing, a ground-based transceiver 1 comprises a laser 2 for producing an optical beam, an acousto-optic deflector cell arrangement 3 for scanning the beam in two dimensions and a digitally-controlled voltage to radio frequency (RF) converter 4 which provides a drive signal for the cell arrangement 3. Digital control of the drive signal enables rapid scanning of the beam.

The transceiver 1 also incorporates a detector element 5 for receiving optical radiation from an external source. The output from the detector 5 and a signal from the voltage to RF converter 4 are both coupled to a computing unit 6.

Also shown in the drawing is a missile 7 which is being tracked by the ground-based transceiver 1. To the rear of the missile 7 are mounted four equi-spaced hemispheres 8 (only two being shown in the figure).

On the outer surface of each hemisphere 8 are located a plurality of transponders 9, each transponder 9 being composed of a photodetector element 10 and a laser diode 11. The photodetector element 10 and laser diode 11 of each transponder 9 are mounted close to one another and aligned so that they are "looking" in the same direction, the beam divergence of the laser diode 11 being at least equal to the field of view of the photodetector element 10.

In operation, the transceiver 1 begins to scan an area containing the missile 7. To ensure that the scanned beam emitted from the transceiver 1 illuminates at least one transponder 9, the transponders 9 are sufficient in number and so disposed around the hemishpere 8 that the fields of view of each of them overlap. When the scanned beam illuminates one of the photodetector elements 10 mounted on a hemisphere 8, the adjacent laser diode 11 is immediately switched on, sending a beam back to the transceiver 1. This beam is detected by the detector element 5 which sends an output signal to the computing unit 6. From information transmitted by the voltage to RF converter 4, the computing unit 6 is able to deduce the scan co-ordinates of the beam from the laser 2 at the moment it receives the signal from the detector element 5. Hence, the angular location of the missile 7 relative to, say, the boresight of the laser 2 is known. By monitoring instantaneous values of angular location, the missile 7 can be tracked.

In an alternative embodiment, each detector/emitter pair forming a transponder 9 is mounted within the body of the missile and communciates with the missile's surface via fiber optic links. In a further embodiment, the transponders 9 incorporate means for modulating the beam emitted by the laser diodes 11. This modulation could be used to convey IFF information to the ground-based transceiver 1.

I claim:

1. A tracking system comprising:

a transceiver including means for producing a scanned, first optical beam for illumination of a projectile;

a plurality of transponders for mounting on said projectile, each of said plurality of transponders comprising:

a detector/emitter pair for detecting said scanned beam and for actively emitting a second optical beam in response to a detection of said scanned beam, to be received by said transceiver;

said transceiver further including means for monitoring an angular location of said scanned beam based on a moment that said transceiver receives said second optical beam to thereby track said projectile.

2. A tracking system according to claim 1, wherein said means for producing said scanned optical beam comprises:

an acousto-optic deflector cell; and a laser coupled to said acousto-optic deflector cell.

3. A tracking system according to claim 1, wherein each of said plurality of transponders comprise:

a photodetector element; and a laser diode.

4. A tracking system comprising:

a transmitter and a receiver, said transmitter including means for producing a scanned optical beam for illumination of a projectile; and a plurality of transponders for mounting on said projectile, each of said plurality of transponders comprising a detector/emitter pair for detecting said scanned beam and for emitting a further optical beam in response thereto for reception by said receiver;

each of said plurality of transponders comprising a photodetector element and a laser diode; and said plurality of transponders being distributed over a hemispherical outer surface for mounting on said projectile.

5. A method of tracking a projectile, said method comprising steps of:

launching a projectile;

modulating a laser beam using an acousto-optic deflector;

scanning, from a tracking transceiver, said modulated laser beam across a two-dimensional area of space including an estimated location of said projectile;

detecting an illumination of a first detector on said projectile by said scanned modulated laser beam;

immediately after said illumination of said first detector on said projectile by said scanned modulated laser beam, turning on a laser source adjacent said first detector so as to be received by a second detector in said tracking transceiver;

determining an angular location of said projectile relative to said transceiver based on a moment of an illumination of said second detector by said laser source adjacent said first detector.

6. A method of tracking a projectile according to claim 5, wherein:

said first detector and said laser source adjacent said first detector together form a transponder, said projectile including a plurality of said transponders.

7. A method of tracking a projectile according to claim 5, wherein:

said first detector and said laser source adjacent said first detector are both mounted inside a body of said projectile; and said first detector and said laser source communicate with said transceiver through optical fiber, said optical fiber being disposed between a surface of said projectile, said first detector, and said laser source adjacent said first detector.

8. A method of tracking a projectile according to claim 5, comprising a further step of:

modulating said laser source adjacent said first detector during said step of turning on said laser source adjacent said first detector.

9. A method of tracking a projectile according to claim 8, wherein:

said modulation of said laser source adjacent said first detector includes IFF information.

10. A tracking system comprising:

a ground-based optical transmitter which scans an optical beam for illumination of at least a portion of a projectile;

a ground-based optical receiver which detects an active optical transmission from said projectile;

a plurality of transponders distributed over a hemispherical surface on said projectile, each of said transponders comprising at least one laser source and at least one optical detector;

wherein each of said plurality of transponders detects an illumination of a detector associated therewith by said scanned optical beam and actively emits a return optical beam in response to said detected illumination for reception by said receiver.

11. A tracking system according to claim 10, wherein:

said transponders emit said return optical beam in a direction parallel with a direction in which said scanned laser beam illuminatated said detector associated therewith.

12. A tracking system according to claim 10, wherein:

said optical beam is modulated by said ground-based optical transmitter before transmission therefrom.

13. A tracking system according to claim 10, further comprising:

angular location determination means for determining an angular location of said projectile based on an angular position of said scanned optical beam at a moment that said ground-based optical receiver detects said second optical beam, to thereby track said projectile.

* * * * *

UNITED STATES PATENT AND TRADEMARK OFFICE
CERTIFICATE OF CORRECTION

PATENT NO. : 6,795,174 B1
DATED : September 21, 2004
INVENTOR(S) : Miller

It is certified that error appears in the above-identified patent and that said Letters Patent is hereby corrected as shown below:

Column 3,
Line 2, claim 1 should read as follows:

1. A tracking system comprising:

a transceiver including means for producing a scanned, first optical beam for illumination of a projectile;

a plurality of transponders for mounting on said projectile, each of said plurality of transponders comprising a detector/emitter pair;

at least one of said plurality of transponders being positioned to detect said scanned beam and actively emit a second optical beam in response to said detection of said scanned beam, to be received by said transceiver;

said transceiver further including means for monitoring an angular location of said scanned beam based on a moment that said transceiver receives said second optical beam to thereby track said projectile.

Line 25, claim 4 should read as follows:

4. A tracking system comprising:

a transmitter and a receiver, said transmitter including means for producing a scanned optical beam for illumination of a projectile; and a plurality of transponders for mounting on said projectile, each of said plurality of transponders comprising a detector/emitter pair;

at least one of said plurality of transponders being positioned to detect said scanned beam and emit a further optical beam in response thereto for reception by said receiver;

each of said plurality of transponders comprising a photodetector element and a laser diode; and said plurality of transponders being distributed over a hemispherical outer surface for mounting on said projectile.

Column 4,
Line 37, "each" should read -- at least one --.

Signed and Sealed this

Eleventh Day of January, 2005

JON W. DUDAS
*Director of the United States Patent and Trademark Office*